United States Patent
Kawasaki

(10) Patent No.: US 7,918,139 B2
(45) Date of Patent: *Apr. 5, 2011

(54) PIRANI VACUUM GAUGE

(75) Inventor: Yohsuke Kawasaki, Yamanashi (JP)

(73) Assignee: Canon Anelva Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/700,068

(22) Filed: Feb. 4, 2010

(65) Prior Publication Data

US 2010/0132475 A1    Jun. 3, 2010

Related U.S. Application Data

(60) Division of application No. 12/425,454, filed on Apr. 17, 2009, now Pat. No. 7,694,574, which is a continuation-in-part of application No. PCT/JP2008/066660, filed on Sep. 16, 2008.

(30) Foreign Application Priority Data

Sep. 13, 2007    (JP) ................... 2007-238040

(51) Int. Cl.
 G01L 21/12    (2006.01)
 G01L 21/30    (2006.01)
 G01L 7/00    (2006.01)
(52) U.S. Cl. ............... 73/755; 324/460; 702/138
(58) Field of Classification Search ............ None
See application file for complete search history.

(56) References Cited

U.S. PATENT DOCUMENTS

| | | | |
|---|---|---|---|
| 1,993,063 A | 3/1935 | Klopsteg | 73/755 |
| 2,678,986 A * | 5/1954 | Ward | 338/36 |
| 4,995,264 A | 2/1991 | Stocker et al. | 73/702 |
| 5,475,623 A | 12/1995 | Stocker | 702/98 |
| 6,619,131 B2 | 9/2003 | Walchli et al. | 73/718 |
| 2008/0115585 A1 | 5/2008 | Miyashita et al. | 73/755 |

FOREIGN PATENT DOCUMENTS

| | | |
|---|---|---|
| JP | 48-041093 | 12/1973 |
| JP | 6-066662 | 3/1994 |
| JP | 6-160226 | 6/1994 |
| JP | 3188752 | 5/2001 |
| WO | WO 2006/057148 A1 | 6/2006 |

* cited by examiner

*Primary Examiner* — Harshad Patel
(74) *Attorney, Agent, or Firm* — Fitzpatrick, Cella, Harper & Scinto

(57) ABSTRACT

A Pirani vacuum gauge in which a response to a rapid pressure rise is improved and restrictions on a mounting direction of a container on a chamber to be measured for pressure are eliminated is provided. The Pirani vacuum gauge includes a heat filament of metal wire and a support unit for supporting the heat filament in a container, wherein a gas pressure is measured based on an amount of heat conducted away from the heat filament by gas molecules colliding with the heat filament, characterized in that a body of the container is filled with metal material, but a first cylindrical bore and a second cylindrical bore extend through the body, the heat filament being inserted into the first cylindrical bore and the support unit being inserted into the second cylindrical bore.

7 Claims, 5 Drawing Sheets

D-D' SECTIONAL VIEW

A-A' SECTIONAL VIEW

B-B' SECTIONAL VIEW

C-C' SECTIONAL VIEW

D-D' SECTIONAL VIEW

E-E' SECTIONAL VIEW

F-F' SECTIONAL VIEW ( PRIOR ART )

PIRANI VACUUM GAUGE

CROSS-REFERENCES TO RELATED APPLICATIONS

This application is a Divisional of U.S. application Ser. No. 12/425,454, filed Apr. 17, 2009, which is a continuation application of International Application No. PCT/JP2008/066660, filed on Sep. 16, 2008, the entire contents of which are incorporated by reference herein.

This application also claims the benefit of priority from Japanese Patent Application No. 2007-238040 filed Sep. 13, 2007, the entire contents of which is incorporated herein by reference.

BACKGROUND OF THE INVENTION

1. Field of the Invention

The present invention relates to a Pirani vacuum gauge which is widely used for pressure measurement in a low to high vacuum range by use of heat conduction of a gas.

2. Related Background Art

As disclosed in Japanese Patent No. 3188752, in conventional Pirani vacuum gauges, a heat filament made of metal wire is suspended and heated in a vacuum. When gas molecules having a lower temperature than that of the heat filament which is in a high-temperature state collide with the heat filament, the colliding gas molecules conduct heat away from the heat filament. The temperature of the heat filament thereby changes. A temperature change corresponding to the amount of heat conducted away is electrically converted and detected as a change in electrical resistance of the heat filament, and the change in electrical resistance is further converted to a pressure value, to thereby determine a gas pressure. In most general Pirani vacuum gauges presently available on the market, applied power is automatically controlled by a control circuit such that the temperature of the heat filament is always constant. This type of Pirani vacuum gauge is called a constant temperature Pirani vacuum gauge, in which the amount of heat lost is measured by constantly compensating for the amount of heat conducted away from the heat filament by the gas molecules. In this case, the power to be applied such that the temperature of the heat filament is constant is measured and converted to the gas pressure.

In the conventional vacuum gauges, there is such a problem that measured pressure values are widely varied depending on a mounting posture, that is, depending on whether the filament is vertical or horizontal in a gas range from about $10^4$ Pa to atmosphere pressure. In order to solve the problem, a vacuum gauge which reduces variation in measured pressure values due to the posture difference by covering a part over 80% of the length of a filament with a pipe has been proposed (Pamphlet of International Publication No. 2006/057148).

However, the Pirani vacuum gauge disclosed in Pamphlet of International Publication No. 2006/057148 also has problems as described below.

One of the problems is that it takes several tens of seconds to several minutes to indicate a normal pressure value in a case where a gas pressure rapidly rises from a medium vacuum degree or less to a low vacuum degree by, for example, gas introduction into a chamber to be measured for pressure. Here, the medium vacuum degree is a pressure of about 10 Pa, and the low vacuum degree is a pressure of 1000 Pa or more. A pressure reading temporarily shows a pressure value higher than the normal pressure value until the Pirani vacuum gauge indicates the normal pressure value. When the gas pressure rapidly rises, gas molecules rapidly flow to not only collide with the heat filament, but also collide with the inside wall surface or the like of a container in which the heat filament is accommodated (hereinafter referred to as "container"). Thus, the gas molecules also conduct heat away from the inside wall surface or the like of the container, and the temperature of the container rapidly drops.

Generally, an amount of heat Q conducted away from a heat filament 7 is expressed by the next equation.

$$Q = K_C \cdot P \cdot (T_f - T_w) + K_R \cdot (T_f^4 - T_w^4) + \text{Heat loss at end} \quad (1)$$

$K_C$: Heat conduction coefficient of the amount of heat transferred by a gas
P: Gas pressure
$T_f$: Filament temperature
$T_w$: Temperature of the wall surface around the filament
$K_R$: Heat radiation coefficient The first term of the above equation (1) represents heat conduction loss that is conducted away from the heat filament by gas molecules in a container. Here, the heat conduction coefficient $K_C$ of the amount of heat transferred by a gas is a constant number. The filament temperature $T_f$ is controlled to be constant by a control circuit. The temperature $T_w$ of the wall surface around the filament is determined by the temperature of surroundings where the Pirani vacuum gauge is installed.

The second term of the above equation represents loss by heat radiation from the heat filament 7 to the inside wall surface of the container. The third term represents heat conduction loss to the outside through a member for supporting the heat filament 7, to which the heat filament 7 is connected, and a lead wire connected thereto. That is, according to the above equation (1), when the temperature $T_w$ of the wall surface around the heat filament drops, the amount of heat Q conducted away from the heat filament is increased and the gas pressure is also indicated to be higher in proportion to the amount of heat Q. However, the temperature drop of the container is only temporary, and the temperature reaches the same temperature as that in the container in several tens of seconds to several minutes after the rapid flow of gas molecules recedes.

It is an object of the present invention to solve the aforementioned problems. That is, an object of the present invention is to provide a Pirani vacuum gauge in which restrictions on a mounting direction on a chamber to be measured for pressure are eliminated and a response to a rapid pressure rise is improved.

Another object of the present invention is to provide a Pirani vacuum gauge whose usability is improved.

SUMMARY OF THE INVENTION

A Pirani vacuum gauge according to the present invention includes a heat filament of metal wire, a support unit for supporting the heat filament and an elongated container for accommodating the heat filament and the support unit, wherein one end of the container is provided with a coupling end which couples the gauge to a chamber to be measured for pressure and the other end of the container is provided with means which electrically connects the heat filament and the support unit to an external control circuit with holding the heat filament and the support unit in an air sealing to an atmosphere, and the heat filament and the support unit extend within the elongated container in a longitudinal direction from the one end to the other end of the container, characterized in that a body of the container is filled with metal material, but a first bore and a second bore longitudinally extend through the body of the container, the first bore and second bore accommodating respectively the heat filament and the support unit, and the coupling end of the container to the chamber to be measured for pressure has a recess space dented toward the inside of the container and one end of the heat filament and one end of the support unit are jointed in the recess space.

In a first embodiment of the present invention, the first and second bores are in a cylindrical shape. In one embodiment of the present invention, the first and second bores communicate to each other with a longitudinal slit the thickness of which is less than or equal to 2 mm.

In another embodiment of the present invention, the Pirani vacuum gauge further includes a temperature sensor contacted to a recess provided at an outside wall surface of the container.

A Pirani vacuum gauge according to a second aspect of the present invention includes a heat filament (7) of metal wire, a support unit for supporting the heat filament and an elongated container which envelops a part of over 80% of the longitudinal whole length of each of the heat filament and the support unit wherein one end of the gauge is provided with a coupling end which couples the gauge to a chamber to be measured for pressure and the other end of the gauge is provided with means (13) which electrically connects the heat filament and the support unit to an external control circuit with holding the heat filament and the support unit in an air sealing to an atmosphere, and the heat filament and the support unit extend within the elongated container in a longitudinal direction from the one end to the other end of the container. The elongated container is a rod body made of metal material wherein a first bore and a second bore longitudinally extend through the rod body, the first bore accommodating the heat filament and the second bore accommodating the support unit, a distance between a wall surface of the first bore and the heat filament is less than or equal to 3 mm, and a thickness of the rod body around the first bore except for a part facing the second bore is larger than or equal to 2 mm.

According to the Pirani vacuum gauge of the present invention, even when a gas pressure rapidly rises from a medium vacuum degree of 10 Pa or less to a low vacuum degree of 1000 Pa or more, the Pirani vacuum gauge can respond thereto with an excellent following property. Also, restrictions on a mounting direction of the container on the chamber to be measured for pressure are reduced, so that the usability is improved.

DESCRIPTION OF THE PREFERRED EMBODIMENTS

In the following, preferred embodiments for carrying out the present invention will be described in detail with reference to the drawings.

Figure 1:
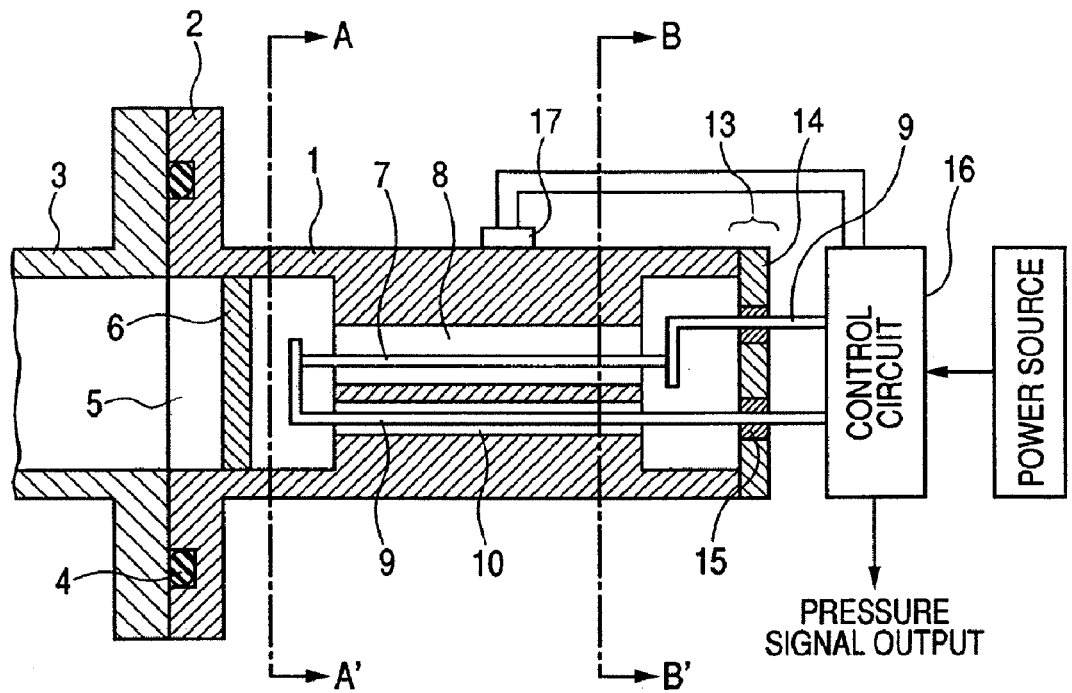
FIG. 1 is a block diagram of a pressure gauge head according to a first embodiment of the present invention.
Figure 2:
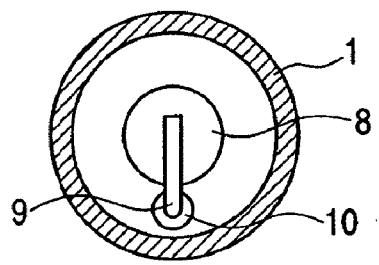
FIG. 2 is a view of a hermetic terminal side of a pressure gauge head as viewed from a section taken along a line A-A' according to the first embodiment of the present invention.
Figure 3:
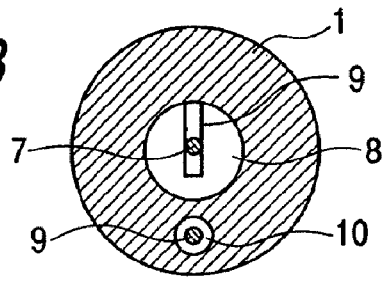
FIG. 3 is a view of a hermetic terminal side of a pressure gauge head as viewed from a section taken along a line B-B' according to the first embodiment of the present invention.

FIGS. 1 to 3 show a first embodiment of the present invention. To be more specific, FIGS. 1 to 3 show a part of a chamber to be measured for pressure and the main part configuration of a Pirani vacuum gauge mounted thereon.

In FIGS. 1 to 3, one end of a container 1 is connected to a chamber 3 to be measured for pressure by a flange 2 for coupling the gauge to the chamber 3 to be measured for pressure. In the present embodiment, a joint of the flange 2 is vacuum-sealed with an O-ring 4. The container 1 opens on the flange 2 side with a recess space dented toward the inside of the container. The container 1 is connected to the chamber 3 to be measured for pressure on the flange 2 side. A stainless-steel sintered filter 6 is mounted in the recess space 5 of the container to prevent contaminants and reaction products from the chamber 3 to be measured for pressure from attaching to a heat filament 7. Gas molecules in the chamber 3 to be measured for pressure pass through the sintered filter 6, and reach the body of the container 1. One end of the heat filament 7 and one end of a support unit 9 are jointed in the recess space. The body of the container is filled with metal material. Two cylindrical bores, a first cylindrical bore 8 into which the heat filament 7 is inserted without contacting the bore surface and a second cylindrical bore 10 into which the support unit 9 made of conductive metal is inserted without contacting the bore surface, extend through the container 1. A part over 80% of the longitudinal whole length of the heat filament 7 is accommodated within the first cylindrical bore 8. In the present embodiment, the first cylindrical bore 8 has a bore diameter of 4 mm, and the second cylindrical bore 10 has a bore diameter of 1.6 mm. A distance between the wall surface of the first cylindrical bore 8 and the heat filament is preferably less than or equal to 3 mm. When the distance is less than or equal to 3 mm, the influence of gas convection occurring around the heat filament can be suppressed, and restrictions on a mounting direction of the container on the chamber to be measured for pressure can be eliminated. The surrounding area of the first cylindrical bore is filled with metal material, the thickness of which is 3.4 mm in the present embodiment.

The thickness is preferably larger than or equal to 2 mm, and more preferably larger than or equal to 3 mm. Metal material having a high heat conductivity such as stainless steel, aluminum and copper is used for the material of the container 1. The support unit 9 for supporting the heat filament 7 is mounted on a hermetic terminal 13 on the opposite side of the recess space 5. The hermetic terminal 13 and the container 1 are coupled together and held in an air sealing to an atmosphere. A base plate 14 of the hermetic terminal 13 is made of Fe/Ni alloy. The support unit 9 for supporting the heat filament 7 made of metal wire such as tungsten wire is made of Kovar alloy. The support unit 9 not only supports the heat filament, but also functions as a lead wire for supplying electric current from a control circuit 16. The support unit 9 is held by being insulated from the base plate 14 by a glass insulating spacer 15. The support unit 9 is also connected to the control circuit 16 for controlling the heat filament 7 at a constant temperature on the atmosphere side. A temperature sensor 17 is provided at the outside wall surface of the container 1. The temperature sensor 17 detects and provides the temperature of the heat filament to the control circuit 16. The Pirani vacuum gauge functions as a constant temperature Pirani vacuum gauge which calculates a gas pressure by measuring the amount of power supplied to the heat filament 7 to keep the temperature of the heat filament 7 constant. The gas molecules in the chamber 3 to be measured for pressure pass through the sintered filter 6 via the recess space 5, and collide with the surface of the heat filament 7. The gas molecules colliding with the heat filament 7 conduct heat away from the heat filament 7, and collide with the wall surface of the first cylindrical bore 8 of the container 1 to transfer the heat thereto. When there are more gas molecules, that is, when the gas pressure is higher, the number of gas molecules to collide with the heat filament 7 is increased, and the amount of heat conducted away from the heat filament 7 to the wall surface of the first cylindrical bore 8 due to the collision of gas molecules is also increased. The amount of heat Q conducted away from the heat filament 7 here is obtained by the same equation as the aforementioned equation (1).

By providing the second cylindrical bore 10 into which the support unit 9 is inserted, the heat filament 7 can be centrally inserted into the first cylindrical bore 8. Also, the distance between the heat filament 7 and the wall surface of the first cylindrical bore 8 can be made less than or equal to 3 mm, by which the restrictions on the mounting direction of the container 1 on the chamber to be measured for pressure can be eliminated. At the same time, because of the structure with the first cylindrical bore 8 and the second cylindrical bore 10, flowability, that is, conductance of gas molecules can be improved, and a pressure reading can be stabilized with an excellent response to a rapid change in the gas pressure.

Figure 10:
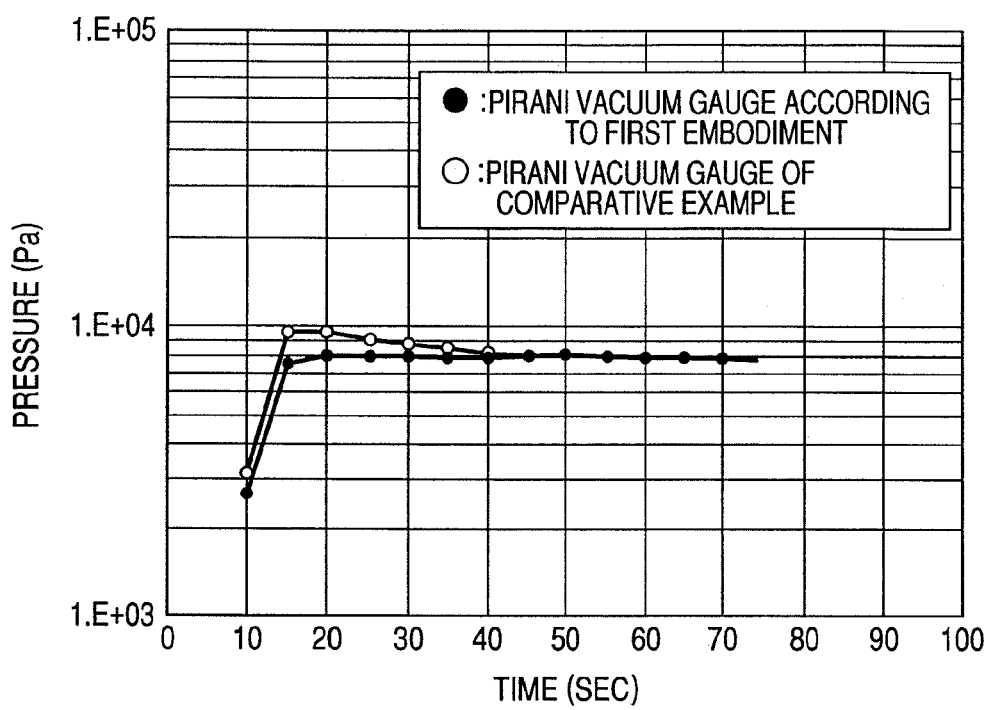
FIG. 10 is a graph showing data obtained by measuring stabilization of pressure readings when a pressure is rapidly increased from a high vacuum pressure to a pressure of about $1 \times 10^4$ Pa by gas introduction into a chamber to be measured for pressure in a Pirani vacuum gauge according to the first embodiment of the present invention and a Pirani vacuum gauge of the related art.
Figure 11:
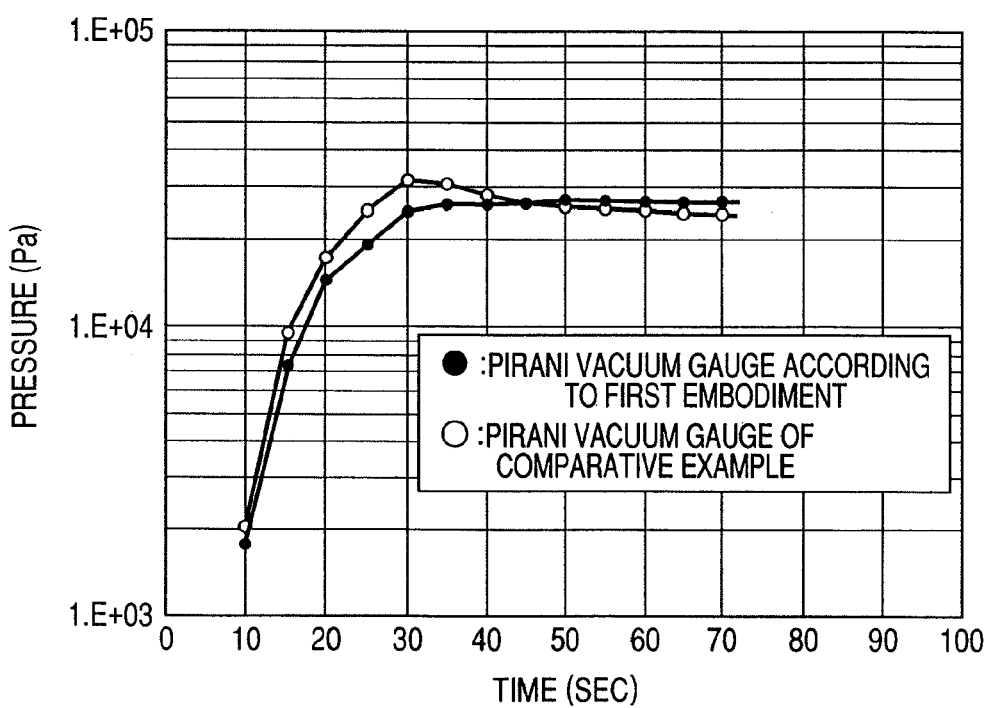
FIG. 11 is a graph showing data obtained by measuring stabilization of pressure readings when a pressure is rapidly increased from a high vacuum pressure to a pressure of about $3 \times 10^4$ Pa by gas introduction into a chamber to be measured for pressure in a Pirani vacuum gauge according to the first embodiment of the present invention and a Pirani vacuum gauge of the related art.
Figure 12:
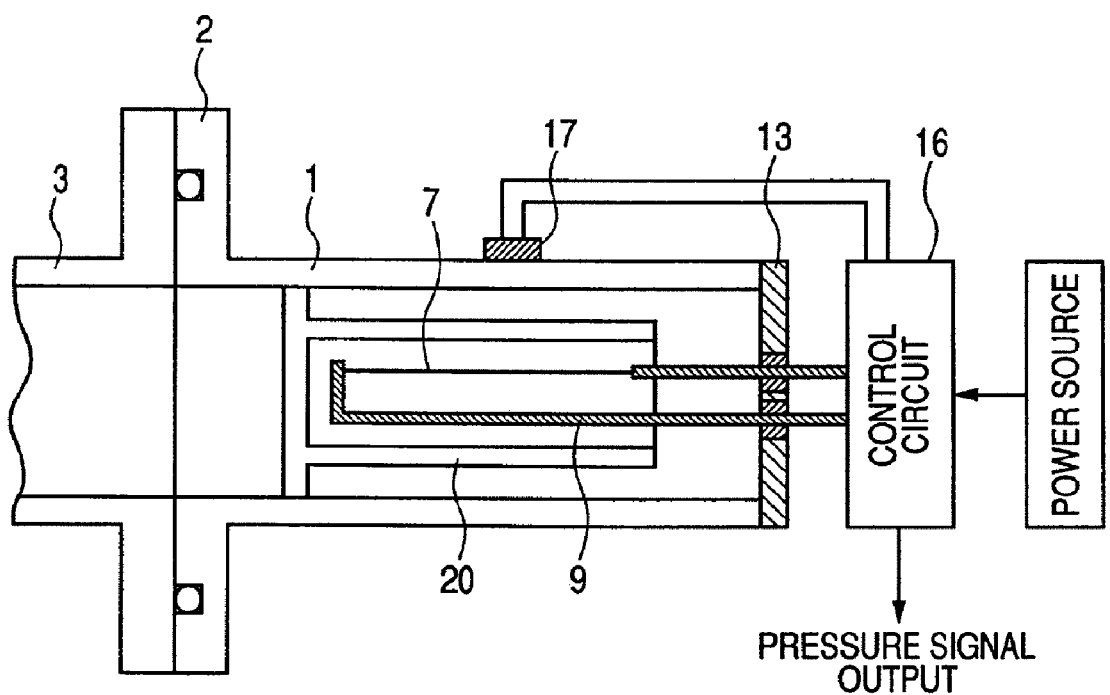
FIG. 12 is a view showing the structure of a Pirani vacuum gauge of a comparative example used in the measurement of FIG. 10.

FIGS. 10 and 11 show data obtained by measuring stability of pressure readings when the pressure is rapidly increased from a high vacuum pressure to a pressure of about $1 \times 10^4$ Pa in FIG. 10 and about $3 \times 10^4$ Pa in FIG. 11 by gas introduction into the chamber to be measured for pressure. In FIGS. 10 and 11, a Pirani vacuum gauge of a comparative example (○ marker) shown in FIG. 12 and the Pirani vacuum gauge according to the second embodiment (● marker) are compared. In FIG. 12, the same components as those in FIG. 1 are assigned the same reference numerals. A container 1 has a hollow cylindrical shape. In a container space, a heat filament 7 and a support unit 9 are covered by a cylindrical body 20. A distance between the filament 7 and the closest wall surface of the cylindrical body 20 is less than or equal to 3 mm such that a measured pressure value is not varied depending on whether the filament 7 is vertical or horizontal. The thickness of the cylindrical body is less than 2 mm. That is, in FIG. 10, for example, the Pirani vacuum gauge of the comparative example temporarily indicates a high pressure after gas introduction, and then, the pressure reading is stabilized in about 30 to 40 seconds. On the other hand, in the Pirani vacuum gauge according to the second embodiment, the pressure reading is stabilized in five seconds with an excellent following property without temporarily indicating a high pressure. FIG. 11 also shows that the pressure reading is stabilized in a shorter time in the Pirani vacuum gauge according to the first embodiment than in the Pirani vacuum gauge of the comparative example.

Figure 4:
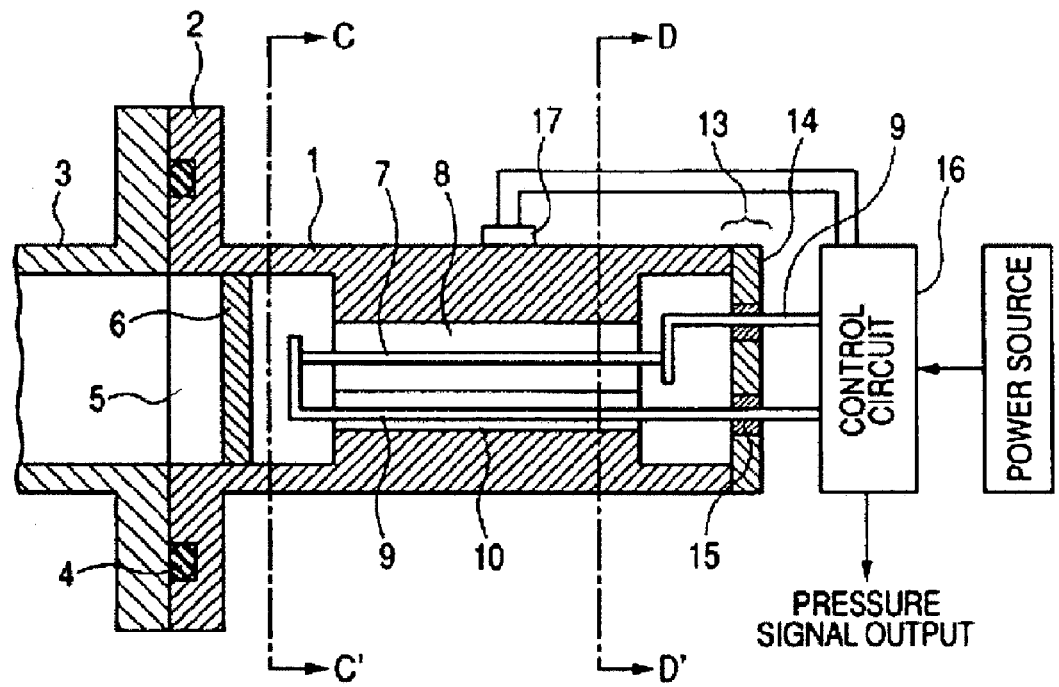
FIG. 4 is a block diagram of a pressure gauge head according to a second embodiment of the present invention.
Figure 5:
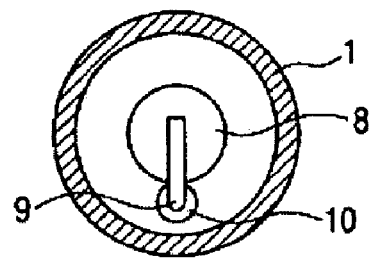
FIG. 5 is a view of a hermetic terminal side of a pressure gauge head as viewed from a section taken along a line C-C' according to the second embodiment of the present invention.
Figure 6:
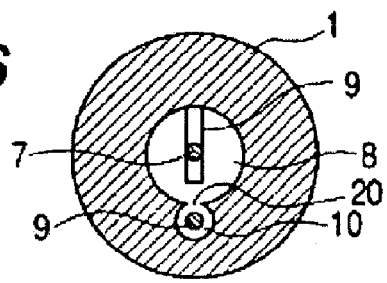
FIG. 6 is a view of a hermetic terminal side of a pressure gauge head as viewed from a section taken along a line D-D' according to the second embodiment of the present invention.

FIGS. 4 to 6 show a second embodiment of the present invention. In FIGS. 4 to 6, the same components as those in the first embodiment are assigned the same reference numerals. In the present embodiment, the first cylindrical bore into which the heat filament is inserted, and the second cylindrical bore into which the support unit is inserted are provided in a similar manner to the first embodiment. However, the two cylindrical bores partially communicate to each other with a slit 20, the thickness of which is smaller than the bore diameter of the second cylindrical bore in the present embodiment. The thickness may not necessarily be smaller than the bore diameter of the second cylindrical bore, but is preferably less than or equal to 2 mm. That is, a plane perpendicular to the axis of the heat filament has an eight-like shape in a section. According to the second embodiment, the heat filament and the support unit can be integrally mounted on and removed from the container 1, so that the maintainability is improved. Also, by providing the second cylindrical bore, the conductance is increased, and the response in the pressure measurement is improved. Here, the length of an overlapping part of the first cylindrical bore with the second cylindrical bore is preferably less than or equal to one eighth of the inner periphery of the first cylindrical bore. Other configurations and operations are the same as those in the first embodiment.

Figure 7:
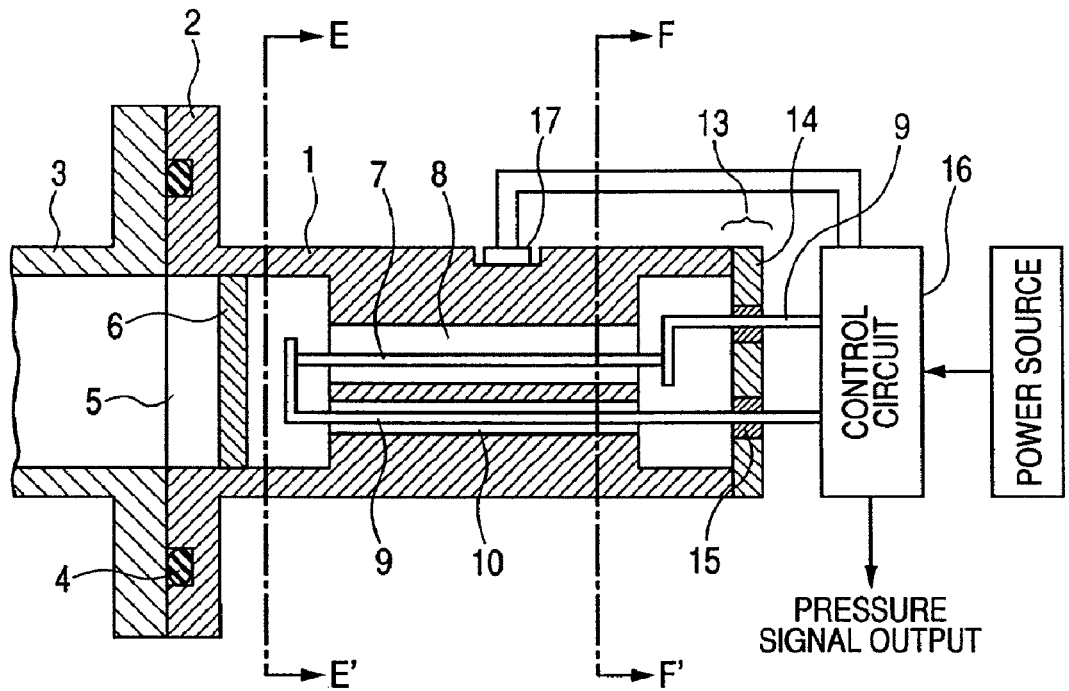
FIG. 7 is a block diagram of a pressure gauge head according to a third embodiment of the present invention.
Figure 8:
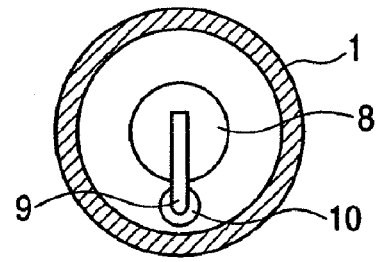
FIG. 8 is a view of a hermetic terminal side of a pressure gauge head as viewed from a section taken along a line E-E' according to the third embodiment of the present invention.
Figure 9:
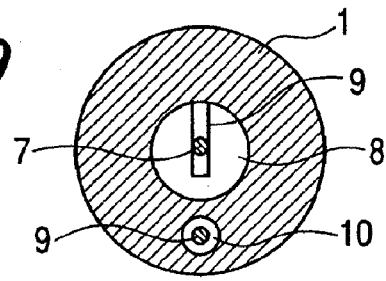
FIG. 9 is a view of a hermetic terminal side of a pressure gauge head as viewed from a section taken along a line F-F' according to the third embodiment of the present invention.

FIGS. 7 to 9 show a third embodiment of the present invention. In FIGS. 7 to 9, the same components as those in the first embodiment are assigned the same reference numerals. In the present embodiment, the Pirani vacuum gauge has the same structure as that of the first embodiment except that a part of the outside wall surface of the container 1 where the temperature sensor is mounted has a recess shape, so that the temperature sensor 17 is mounted close to the inside wall surface of the container 1. According to the third embodiment, a temperature following property is improved since a heat conducting distance between the temperature sensor and the inside wall surface of the container 1 can be reduced. Other configurations and operations are the same as those in the first embodiment. Although the temperature sensor is mounted in the recess provided at the outside wall surface of the container 1 in the third embodiment, the temperature sensor may be also embedded in the outside wall of the container 1.

The cylindrical bore is not limited to a bore having a perfect round sectional shape, and a bore having an elliptic sectional shape, a polygonal sectional shape, or a free-form shape may be also employed.

The present invention can be used as an apparatus for measuring a pressure within a chamber of a conventional semiconductor manufacturing apparatus, electronic device manufacturing apparatus, heat treatment apparatus, surface treatment apparatus or the like, or an apparatus for measuring a pressure within an exhaust line and gas introduction line.

What is claimed is:

1. A Pirani vacuum gauge comprising a heat filament of metal wire, a support unit for supporting said heat filament and an elongated container for defining an air sealed space when the gauge is coupled to a chamber to be measured for pressure and accommodating said heat filament and said support unit in the air sealed space, wherein one end of said container is provided with a coupling end which couples the gauge to a chamber to be measured for pressure and the other end of said container is provided with a means which electrically connects said heat filament and said support unit to an external control circuit with holding said heat filament and said support unit in an air sealing to an atmosphere, and said heat filament and said support unit extend within said elongated container in a longitudinal direction from the one end to the other end of said container, wherein a body of said container is formed of metal material, a first bore and a second bore longitudinally extend through the body of said container, the first bore and second bore accommodating respectively said heat filament and said support unit, and the coupling end to the chamber to be measured for pressure is an end of said body which has a recess space dented toward the inside of said container and one end of said heat filament and one end of said support unit are jointed in the recess space.

2. The Pirani vacuum gauge according to claim 1, wherein a sintered filter is mounted in the recess space.

3. The Pirani vacuum gauge according to claim 1, wherein the first and second bores are in a cylindrical shape.

4. The Pirani vacuum gauge according to claim 1, wherein the first and second bores communicate to each other with a slit the thickness of which is less than or equal to 2 mm.

5. The Pirani vacuum gauge according to claim 1, a distance between a wall surface of the first bore and the heat filament is less than or equal to 3 mm.

6. The Pirani vacuum gauge according to claim 1, wherein a part over 80% of a longitudinal whole length of the heat filament is accommodated within the first bore.

7. The Pirani vacuum gauge according to claim 1 further comprising a temperature sensor contacted to a recess provided at an outside wall surface of said container.

* * * * *